US008565667B2

(12) United States Patent  
Argott

(10) Patent No.: US 8,565,667 B2  
(45) Date of Patent: Oct. 22, 2013

(54) METHODS AND COMPUTER PROGRAM PRODUCTS FOR INTERACTIVE PRESENTATION OF EDUCATIONAL CONTENT AND RELATED DEVICES

(71) Applicant: AT&T Intellectual Property I, L.P., Reno, NV (US)

(72) Inventor: Lauren Argott, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/690,379

(22) Filed: Nov. 30, 2012

(65) Prior Publication Data

US 2013/0149687 A1 Jun. 13, 2013

Related U.S. Application Data

(63) Continuation of application No. 11/950,853, filed on Dec. 5, 2007, now Pat. No. 8,358,963.

(51) Int. Cl.
*G09B 3/00* (2006.01)

(52) U.S. Cl.
USPC .......................................... 434/350; 434/322

(58) Field of Classification Search
USPC .......... 434/322–365, 156–185, 219; 370/338; 709/209–210, 223–225, 243–244, 248
See application file for complete search history.

(56) References Cited

U.S. PATENT DOCUMENTS

| | | |
|---|---|---|
| 6,411,796 B1 | 6/2002 | Remschel |
| 2004/0229201 A1 | 11/2004 | Korkko et al. |
| 2005/0102407 A1 | 5/2005 | Clapper |
| 2005/0158698 A1 | 7/2005 | Boys |
| 2005/0233296 A1 | 10/2005 | Ziv-el et al. |
| 2006/0147891 A1 | 7/2006 | Dreyfous et al. |
| 2009/0122775 A1 | 5/2009 | Haartsen |

*Primary Examiner* — Timothy A Musselman
(74) *Attorney, Agent, or Firm* — Myers Bigel Sibley & Sajovec, P.A.

(57) ABSTRACT

A method of presenting educational content to a plurality of students in a classroom includes displaying the educational content on an instructor terminal in the classroom. A synchronization command is wirelessly transmitted to a plurality of portable student terminals in the classroom according to a localized wireless connection protocol. The synchronization command is configured to display, on the plurality of portable student terminals, the educational content that is displayed on the instructor terminal. The plurality of portable student terminals may be respectively associated with ones of the plurality of students who are registered for an academic course associated with the educational content. An ad hoc wireless data connection may also be selectively established with at least one of the plurality of portable student terminals in the classroom. Related systems, devices, and computer program products are also discussed.

19 Claims, 7 Drawing Sheets

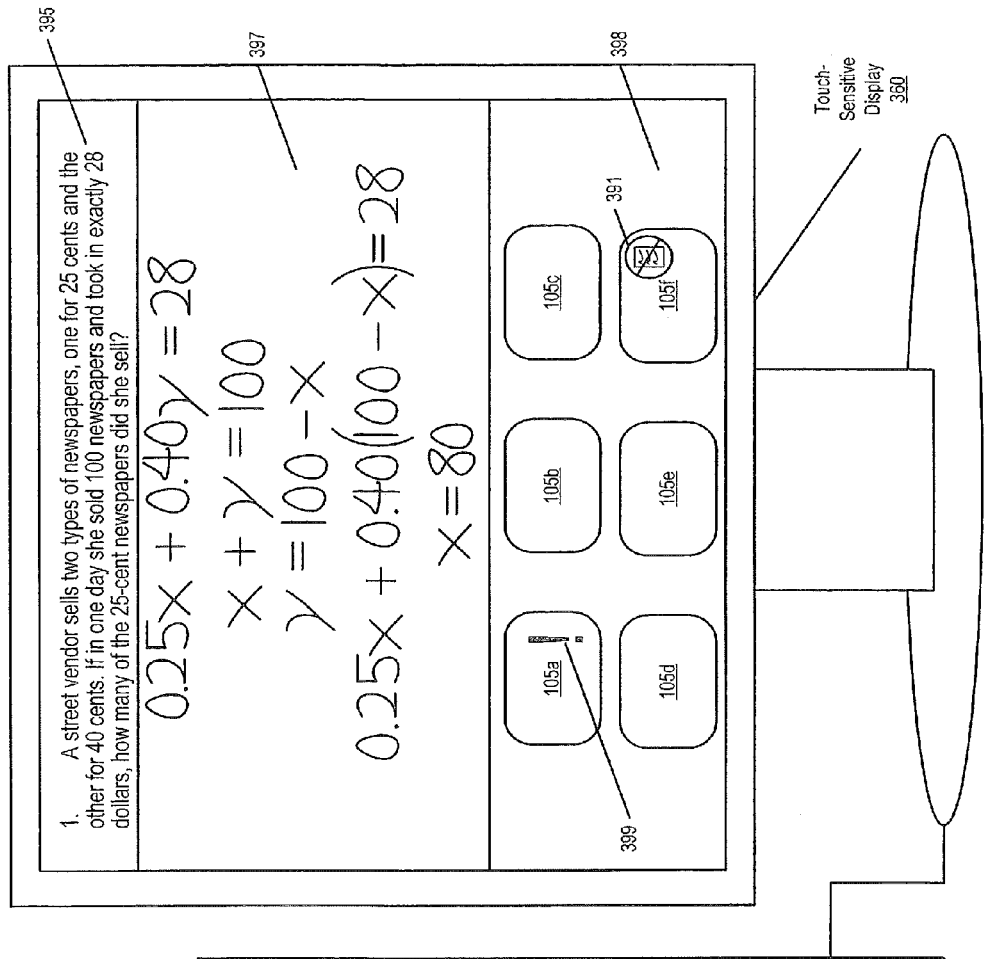
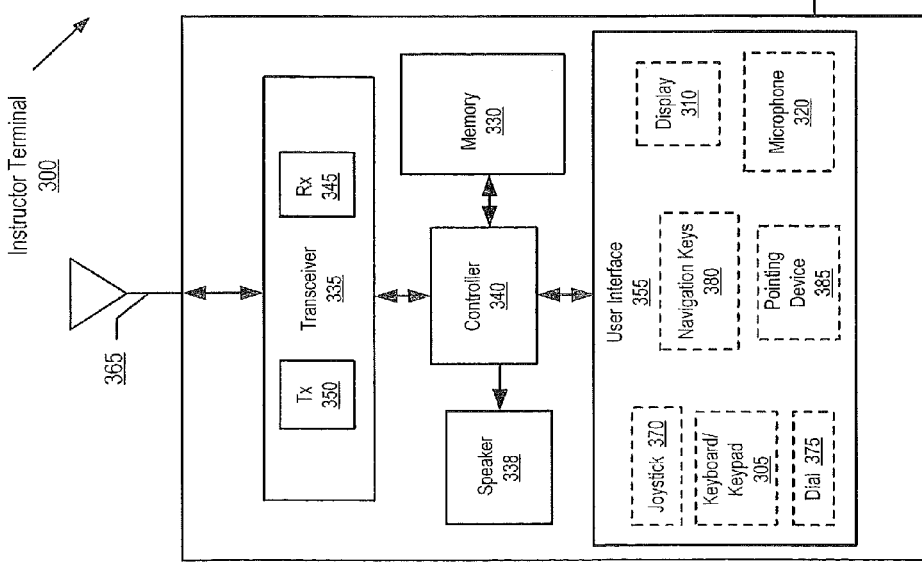
FIG. 3

| Id | Student name | School year | SID Field 1 | SID Field 2 | SID Field 3 |
|---|---|---|---|---|---|
|  |  |  |  |  |  |
|  |  |  |  |  |  |

Student ID Table 601     FIG. 6A

| Id | School District | School Name | SNField 1 | SN Field 2 | SN Field 3 |
|---|---|---|---|---|---|
|  |  |  |  |  |  |

School Name Table 602     FIG. 6B

| Id | Class Name | Class Time | Class Room | Class ID | Teacher Name | Teacher Id | Initial download |
|---|---|---|---|---|---|---|---|
|  |  |  |  |  |  |  |  |
|  |  |  |  |  |  |  |  |

Class Schedule Table 603     FIG. 6C

| Id | Photo | Photo ID field 1 | Photo ID field 2 | Photo ID field 3 |
|---|---|---|---|---|
|  |  |  |  |  |
|  |  |  |  |  |

Student Photo ID Table 604     FIG. 6D

| Id | School Name | School Map | SM Field 1 | SM Field 2 | SM Field 3 |
|---|---|---|---|---|---|
|  |  |  |  |  |  |
|  |  |  |  |  |  |

School Map Table 605     FIG. 6E

FIG. 6F

| Id | Teacher Id | Teacher Name | Class Seat | Field 2 | Field 3 | Field 4 |
|---|---|---|---|---|---|---|
|  |  |  |  |  |  |  |

Teacher's Information Table 606
(one per teacher, set up during Initial Class Day Program)

METHODS AND COMPUTER PROGRAM PRODUCTS FOR INTERACTIVE PRESENTATION OF EDUCATIONAL CONTENT AND RELATED DEVICES

RELATED APPLICATION

This application is a continuation of U.S. application Ser. No. 11/950,853, filed Dec. 5, 2007, the disclosure of which is hereby incorporated herein by reference as if set forth in its entirety.

BACKGROUND

The present invention relates generally to the field of communications networks, and more particularly, to methods of providing educational content over communications networks and related devices.

A variety of problems are encountered in today's public school systems. One of the primary problems that plagues public education is the lack of funding for resources, such as textbooks. Textbooks may be a fundamental component of current public education systems, and as such, may be required for every student. Often, several books may be assigned to each student for each class. Additional and/or supplemental books may also be required during different portions of the school year, for example, for special projects. In addition, textbooks may be frequently revised by publishers, which may require replacement of entire supplies of books in the school systems in which such books are used.

Students may also physically struggle with the problem of transporting textbooks from one class to another, as verified by recent studies illustrating the physical strain being placed on students' backs. Moreover, schools themselves may impose limitations on the types of backpacks that students may carry, for example, due to rising crime rates within the school grounds. In some cases, students may also be required to carry identification to even be permitted on school grounds.

Accordingly, electronic books, also called e-books, have been developed. E-books may refer to a book that is available in electronic format. For example, e-books may be available in Adobe PDF or eBook Reader format, as well as many other formats. As such, e-books may be read on personal computers. Also, dedicated hardware devices, known as e-book readers, may also be used to view e-books.

In addition, companies such as Intel's Classmate PC and the One Laptop Per Child (OLPC) organization have developed inexpensive laptop computers for use by children, especially by those in developing countries, to provide them with access to knowledge. These rugged, low-power computers may contain flash memory instead of a hard drive, and may use mobile ad-hoc networking to provide many machines with Internet access from one connection. However, the capabilities of such devices may also be abused by children. For example, some children may use such devices to play computer games during class and/or view inappropriate content available on the World Wide Web, rather than for educational purposes. As such, these devices may be used to undermine the very quality of education that they seek to improve.

SUMMARY

According to some embodiments, a method of presenting educational content to a plurality of students in a room includes displaying the educational content on an instructor terminal in the room. A synchronization command is wirelessly transmitted to a plurality of portable student terminals in the room according to a localized wireless connection protocol. The synchronization command is configured to display, on the plurality of portable student terminals, the educational content that is displayed on the instructor terminal.

In some embodiments, an ad hoc wireless data connection is selectively established with at least one of the plurality of portable student terminals in the room according to the localized wireless connection protocol. For example, in some embodiments, the ad hoc wireless data connection may be selectively established responsive to wirelessly transmitting the synchronization command. In other embodiments, respective ad hoc wireless data connections may be established with the plurality of portable student terminals according to the localized wireless connection protocol, and the synchronization command may be wirelessly transmitted to the plurality of portable student terminals via the respective ad hoc wireless data connections.

In other embodiments, an information request may be transmitted to the one of the plurality of student terminals via the ad hoc wireless data connection. Data may be received from the one of the plurality of portable student terminals via the ad hoc wireless data connection indicating content currently displayed thereon responsive to transmitting the information request. An indication of the content that is currently displayed on the one of the plurality of portable student terminals may be thereby displayed on the instructor terminal.

In some embodiments, the educational content may be a portion of an electronic representation of a textbook stored in each of the plurality of portable student terminals. As such, the synchronization command may be broadcast to the plurality of portable student terminals according to the localized wireless connection protocol. The synchronization command may be configured to display, on the plurality of portable student terminals, the portion of the electronic representation of the textbook that is displayed on the instructor terminal.

In other embodiments, an alert signal may be wirelessly received from one of the plurality of portable student terminals according to the localized wireless connection protocol when the educational content is not displayed thereon responsive to transmitting the synchronization command. An identification of one of the plurality of students that is associated with the one of the plurality of portable student terminals may be displayed on the instructor terminal responsive to receiving the alert signal.

In some embodiments, a lock command may be wirelessly transmitted to at least one of the plurality of portable student terminals according to the localized wireless connection protocol. The lock command may be configured to prevent display of content other than the educational content that is displayed on the instructor terminal thereon.

In other embodiments, a plurality of educational content to be presented to the plurality of portable student terminals may be queued at the instructor terminal. As such, synchronization commands may sequentially transmitted to the plurality of student devices. The synchronization commands are configured to display corresponding ones of the plurality of educational content responsive to selection thereof at the instructor terminal.

In some embodiments, an instructor modification of the displayed educational content may be received at the instructor terminal. The instructor modification may be wirelessly transmitted to the plurality of portable student terminals according to the localized wireless connection protocol for display thereon.

In other embodiments, a request for a homework assignment may be received from the one of the plurality of portable student terminals via the ad hoc wireless data connection. The homework assignment may be transmitted to the one of the plurality of portable student terminals responsive to receiving the request.

In some embodiments, a homework file from the one of the plurality of student terminals may be received at the instructor terminal via the ad hoc wireless data connection. An indication of ones of the plurality of student terminals from which a homework file has not been received may thereby be displayed on the instructor terminal. In addition, homework files received from ones of the plurality of student terminals may be compared at the instructor terminal, and an identification of ones of the plurality of portable student terminals corresponding to substantially similar ones of the received homework files may be displayed at the instructor terminal responsive to the comparison.

In other embodiments, the synchronization command transmitted from the instructor terminal may be wirelessly received at the plurality of portable student terminals according to the localized wireless connection protocol. The educational content that is displayed on the instructor terminal may thereby be displayed on the plurality of portable student terminals.

According to other embodiments, a method of presenting educational content via a portable student terminal in a room includes wirelessly receiving, at the portable student terminal, a synchronization command transmitted from an instructor terminal in the room according to a localized wireless connection protocol. The synchronization command indicates educational content that is currently displayed on the instructor terminal. The educational content that is currently displayed on the instructor terminal is displayed on the portable student terminal responsive to receiving the synchronization command.

In some embodiments, the educational content may be a portion of an electronic representation of a textbook stored in the portable student terminal. The portion of the electronic representation of the textbook may be loaded responsive to receiving the synchronization command, and the portion of the electronic representation of the textbook that is currently displayed on the instructor terminal may be displayed on the portable student terminal.

In other embodiments, an ad hoc wireless data connection may be established with the instructor terminal according to the localized wireless connection protocol.

In some embodiments, a completed homework file associated with the portable student terminal may be encrypted at the portable student terminal. The encrypted completed homework filed may be transmitted to the instructor terminal via the ad hoc wireless data connection.

In other embodiments, the educational content displayed on the portable student terminal may be modified on the portable student terminal. Data indicating the modified educational content may be transmitted to the instructor terminal via the ad hoc wireless data connection. Data indicating instructor corrections the modified educational content may be received from the instructor terminal via the ad hoc wireless data connection, and the instructor corrections may be displayed on the portable student terminal.

In some embodiments, it may be determined whether the portable student terminal is assigned to a student who is registered for an academic course associated with the educational content responsive to receiving the synchronization command. The educational content may thereby be displayed on the portable student terminal responsive to the determination.

In other embodiments, an alert signal and/or data indicating content currently displayed on the portable student terminal may be wirelessly transmitted to the instructor terminal according to the localized wireless connection protocol when the educational content is not displayed on the portable student terminal.

In some embodiments, a lock command may be wirelessly received from the instructor terminal according to the localized wireless connection protocol. Display of content other than the educational content on the portable student terminal may be prevented responsive to receiving the lock command.

According to still other embodiments, a method of operating an instructor terminal to monitor activity on a plurality of portable student terminals in a room, includes selectively establishing an ad hoc wireless data connection with at least one of the plurality of portable student terminals according to a localized wireless connection protocol. An information request is transmitted to the at least one of the plurality of student terminals via the ad hoc wireless data connection, and data is received from the at least one of the plurality of portable student terminals via the ad hoc wireless data connection indicating content currently displayed thereon responsive to transmitting the request. An indication of the content that is currently displayed on the at least one of the plurality of portable student terminals is thereby displayed on instructor terminal.

According to still further embodiments, a system for presenting educational content includes an instructor terminal and a plurality of student terminals in a classroom. The instructor terminal is configured to display the educational content thereon and wirelessly transmit a synchronization command to the plurality of student terminals according to a localized wireless connection protocol. The synchronization command indicates the educational content that is currently displayed on the instructor terminal. The plurality of portable student terminals are configured to wirelessly receive the synchronization command according to the localized wireless connection protocol and display, on the plurality of portable student terminals, the educational content that is currently displayed on the instructor terminal responsive to receiving the synchronization command.

Other methods, systems, devices, and/or computer program products according to other embodiments will become apparent to one with skill in the art upon review of the following drawings and detailed description. It is intended that all such additional methods, systems, devices, and/or computer program products be included within this description, be within the scope of the present invention, and be protected by the accompanying claims.

BRIEF DESCRIPTION OF THE DRAWINGS

FIG. 3 is a block diagram illustrating an instructor terminal configured to be used with communication systems for presenting educational content to a plurality of students in a classroom according to some embodiments.

FIGS. 6A-6F illustrate exemplary database tables stored in portable student terminals according to some embodiments.

DETAILED DESCRIPTION

Figure 1:
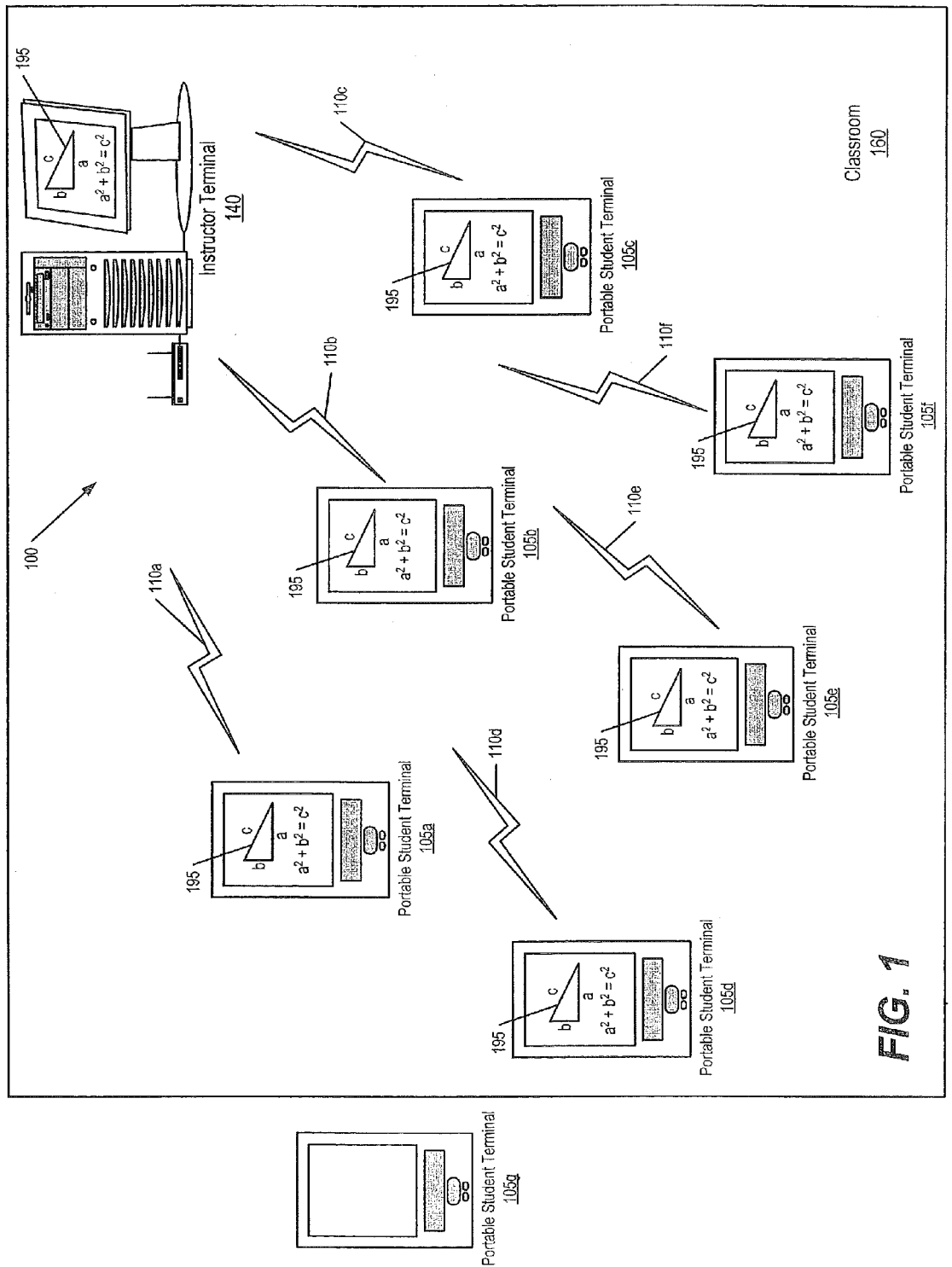
FIG. 1 is a block diagram illustrating a communication system for presenting educational content to a plurality of students in a classroom and related devices according to some embodiments.

Specific exemplary embodiments will now be described with reference to the accompanying drawings. The embodiments described herein should not be construed as limiting. Rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first mobile electronic device could be termed a second mobile electronic device, and, similarly, a second mobile electronic device could be termed a first mobile electronic device without departing from the teachings of the disclosure.

Exemplary embodiments are described hereinafter with reference to flowchart and/or block diagram illustrations of systems, methods, and computer program products in accordance with some embodiments. These flowchart and/or block diagrams further illustrate exemplary operations of the system and device architectures of FIGS. 1 to 3. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Computer program code for carrying out operations of systems, methods, and computer program products according to some embodiments of the present invention discussed below may be written in a high level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

As used herein, the term "portable student terminal" may include any wired and/or wireless portable device that is capable of receiving and displaying educational content, and may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and/or a notebook or laptop computer that includes a wireless local area network transceiver.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and the relevant art, and will not be interpreted in an idealized or overly formal sense unless expressly so defined herein.

FIG. 1 illustrates a wireless ad hoc interactive education system and related devices and methods according to some embodiments. Referring now to FIG. 1, the system 100 includes a plurality of portable student terminals 105a-105g and an instructor terminal 140 in a classroom 160. The portable student terminals 105a-105g may be portable and/or handheld wired and/or wireless electronic devices assigned to each student enrolled in an educational system, and may be configured to load and display electronic representations of textbooks associated with a particular academic course of study. The portable student terminals 105a-105f may also store identification data for a respective student, such as the student's name, photo, class schedule and registration, and/or other student data. For instance, in some embodiments, the portable student terminals 105a-105g may each include the functionality of the Neutron Reader devices described in greater detail below. The instructor terminal 140 may be a portable and/or stationary electronic device, such as a personal computer, that is configured to store educational content associated with one or more academic courses of study and communicate with the portable student terminals 105a-105g over a wireless interface.

More particularly, the portable student terminals 105a-105g may each include a wireless local area network interface transceiver that is configured to support formation of one or more ad hoc wireless data connections between the respective portable student terminals 105a-105g and a similar wireless local area network interface transceiver included in the instructor terminal 140 according to a localized wireless connection protocol. The localized wireless connection protocol may be provided, for example, according to a Wi-Fi standard and/or a Bluetooth standard. In addition, one or more of the portable student terminals 105a-105g may include an infrared (IR) transceiver configured to establish the ad hoc wireless data connections using infrared couplings. The ad hoc wireless data connections 110a-110f allow wireless transmission and receipt of data between the instructor terminal 140 and respective ones of the portable student terminals 105a-105f in the classroom 160.

The instructor terminal 140 may be configured to detect, discover, and/or authenticate one or more portable student terminals 105a-105g within a predetermined distance or transmission range of its wireless local area network transceiver, for instance, based on respective signals received from the portable student terminals 105a-105g, using discovery techniques familiar to those skilled in the art. In some embodiments, to reduce signal interference that may occur during data transmission between ones of the portable student terminals 105a-105f and the instructor terminal 140, the ad hoc wireless data connections 110a-110f may be established using different frequencies and/or spread-spectrum techniques, such as spread-spectrum frequency hopping. Such techniques are well-known in the art and will not be discussed further herein.

Still referring to FIG. 1, the instructor terminal 140 is configured to present educational content 195 that is displayed on the instructor terminal 140 to the students in the classroom 160 via the portable student terminals 105a-105f. The educational content 195 may be, for example, an electronic representation of a textbook and/or a portion thereof, such as section, chapter, page, figure and/or problem of the textbook. The portable student terminals 105a-105f may each include a copy of the educational content 195 stored therein, for instance in an internal and/or removable memory device. Such a memory device may include as a hard disk drive, an optical storage medium, such as a compact disc (CD), and/or other electronic storage medium, such as a flash memory device and/or a cartridge-based storage medium.

The instructor terminal 140 is configured to wirelessly transmit a synchronization command to the portable student terminals 105a-105f according to the localized wireless connection protocol to display the educational content 195 currently displayed on the instructor terminal 140 on the portable student terminals 105a-105f. The synchronization command may instruct a receiving portable student terminal to display the educational content 195 that is currently displayed on the instructor terminal 140. In some embodiments, the instructor terminal 140 may be configured to broadcast the synchronization command to the portable student terminals 105a-105f according to the localized wireless connection protocol as a paging signal. In other embodiments, the instructor terminal 140 may be configured to transmit the synchronization command to the portable student terminals 105a-105f over the respective ad hoc wireless data connections 110a-110f. In still other embodiments, the instructor terminal 140 may be configured to transmit the educational content 195 itself to the to the portable student terminals 105a-105f according to the localized wireless connection protocol.

The synchronization command may also include an identification of an academic course associated with the educational content 195. As such, only portable student terminals assigned to students who are registered for the identified course may be configured to respond to the synchronization command. More particularly, as shown in FIG. 1, an instructor terminal 140 that is configured to be used with a geometry course may broadcast a synchronization command identifying the geometry course, and the portable student terminals 105a-105f may transmit an acknowledgement message to the instructor terminal 140 upon receiving the synchronization command based on respective determinations that the students to whom the portable student terminals 105a-105f are assigned are indeed registered for the identified geometry course. However, portable student terminals and/or other devices assigned to students who are not registered for the identified course may be configured to ignore the broadcast synchronization command. For instance, the portable student terminal 105g outside of the classroom 160 may also receive the broadcast synchronization command, but may not transmit an acknowledgement message based on a determination that the student to whom it is assigned is not registered for the geometry course identified in the broadcast synchronization command.

Upon receiving the synchronization command, the portable student terminals 105a-105f are each configured to display the educational content 195 that is currently displayed on the instructor terminal 140. For example, the synchronization command may include an instruction to load a particular electronic representation of a textbook, and to display a particular chapter, section, page, problem, and/or other portion of the electronic representation of a textbook that is currently displayed on the instructor terminal 140. More particularly, as shown in FIG. 1, the portable student terminals 105a-105f may each include an electronic copy of a geometry textbook stored, for example, in an internal memory and/or on a removable storage media, such as a cartridge. As such, each of the portable student terminals 105a-105f may load and display the geometry content 195 currently displayed on the instructor terminal 140 based on the page, figure, problem, or other portion of the geometry textbook specified by the received synchronization command.

The instructor terminal 140 may be configured to wirelessly transmit the synchronization command to the portable student terminals 105a-105f responsive to an input or selection thereof at the instructor terminal 140. For example, the instructor terminal 140 may be configured to queue a sequence of educational content to be presented to the portable student terminals 105a-105f according to a syllabus or lesson plan, and may sequentially transmit respective synchronization commands identifying the academic course and textbook section to be displayed on the instructor terminal 140 based on the sequence. For example, the instructor terminal 140 may queue sections of a math textbook, a science textbook, and a social studies textbook to be presented to the portable student terminals 105a-105f over the course of a school day, and may transmit the corresponding synchronization commands to the portable student terminals 105a-105f as the instructor moves from page to page in the math, science, and social studies textbooks displayed on the instructor terminal 140 over the course of the day.

The instructor terminal 140 may be also configured to selectively establish respective ad hoc wireless data connections 105a-105f with one or more of the portable student terminals 105a-105f that are assigned to students registered for the course associated with the educational content 195. For example, the instructor terminal 140 may be configured to establish the wireless data connections 110a-110f responsive to receiving an acknowledgment message from one or more of the portable student terminals 105a-105f in response to the broadcast synchronization command. Additionally and/or alternatively, in response to the synchronization command, one of the portable student terminals 105a may wirelessly transmit an alert signal to the instructor terminal 140 indicating that the educational content 195 is not displayed thereon and/or if the displayed content changes without receipt of a synchronization command. The instructor terminal 140 may thereby selectively establish an ad hoc wireless data connection 110a with the portable student terminal 105a responsive to receiving the alert signal. Furthermore, the instructor terminal 140 may selectively establish an ad hoc wireless data connections with one or more of the portable student terminals 105a-105f responsive to receiving a selection thereof via a user interface of the instructor terminal 140 and/or responsive to receiving a request from one or more of the portable student terminals 105a-105f.

In some embodiments, the instructor terminal 140 may be configured to monitor and/or control student use of the portable student terminals 105a-105f in the classroom 160 by transmitting requests for further information to one or more of the portable student terminals 105a-105f via the respective ad hoc wireless data connections 110a-110f. For example, the instructor terminal 140 may selectively establish an ad hoc wireless data connection 110a with the portable student terminal 105a, and may transmit a request to view the content that is currently displayed on the portable student terminal 105a via the ad hoc wireless data connection 110a. In response, the portable student terminal 105a may transmit data indicating the content currently displayed on the portable student terminal 105a over the wireless data connection 110a, which may be received and displayed on the instructor terminal 140. Thus, the instructor terminal 140 may be configured to monitor content that is currently displayed on one or more of the portable student terminals 105a-105f. The instructor terminal 140 may also be configured to transmit a lock command to one or more of the portable student terminals 105a-105f to prevent display of content other than the educational content 195 that is currently displayed on the instructor terminal 140. As such, the instructor terminal 140 may prevent unauthorized use of the portable student terminals 105a-105f in the classroom 160.

Although FIG. 1 illustrates an exemplary ad hoc interactive education system according to some embodiments, it will be understood that some embodiments are not limited to such configuration, but are intended to encompass any configuration capable of carrying out the operations described herein. Moreover, although FIG. 1 illustrates a classroom setting, it should be understood that the systems described herein may be applicable to any organization and are not limited to classroom settings.

Figure 2B:
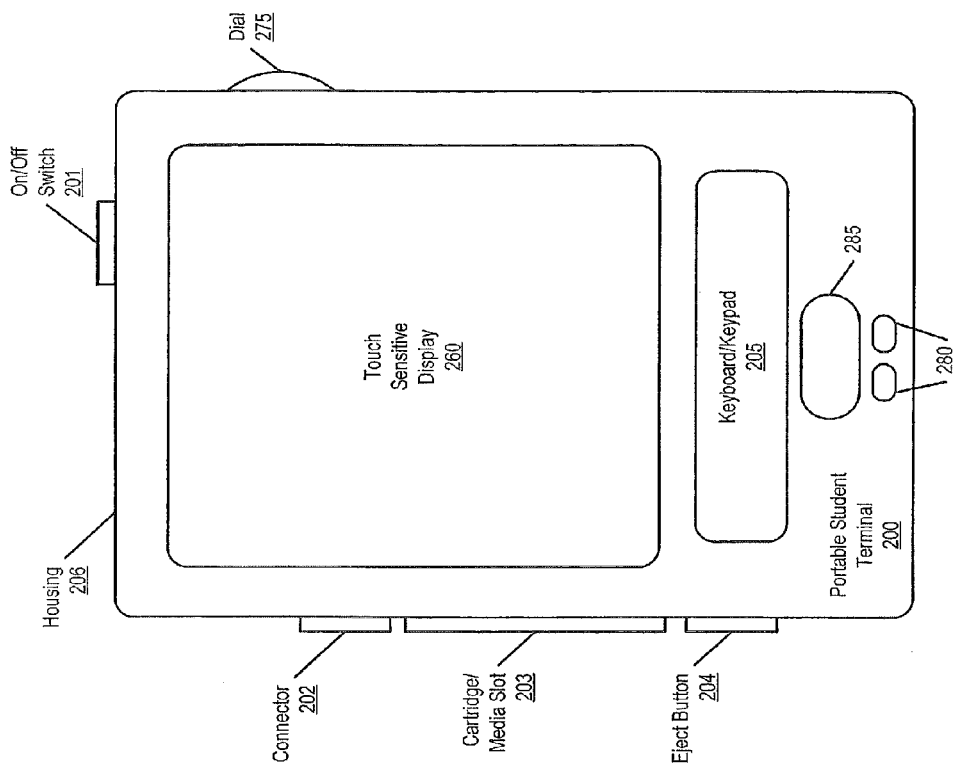
FIGS. 2A and 2B are block diagrams illustrating a portable student terminal configured to be used with communication systems for presenting educational content to a plurality of students in a classroom according to some embodiments.
Figure 2A:
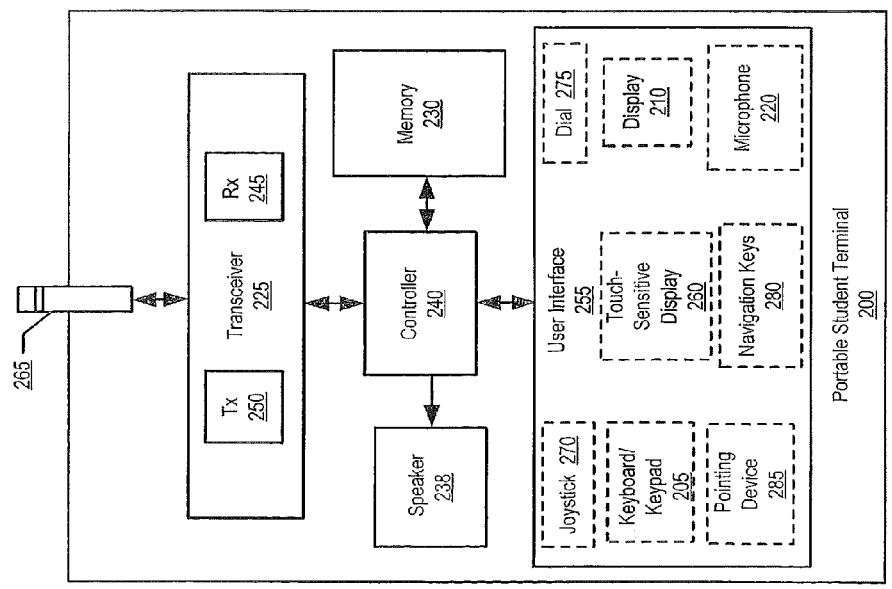

FIG. 2A illustrates a portable student terminal 200 configured to be used in communication systems for presenting educational content to a plurality of students according to some embodiments. In some embodiments, the portable student terminal 200 may correspond to one of the portable student terminals 105a-105g of FIG. 1. Referring now to FIG. 2A, the portable student terminal 200 includes a wireless transceiver 235 coupled to an antenna 265, a controller 240, a memory 230, a speaker 238, and a user interface 255. The transceiver 235 includes a transmitter 250 and a receiver 245. The transceiver 235 includes a wireless local area network interface transceiver configured to establish an ad hoc wireless data connection with an instructor device, such as the instructor terminal 140 of FIG. 1, via the antenna 265. The transceiver 235 is configured to establish the ad hoc wireless data connection according to a localized wireless connection protocol, such as a Bluetooth, Wi-Fi, and/or IR connection protocol.

The memory 230 may represent a hierarchy of memory that may include volatile and/or non-volatile memory, such as removable flash, magnetic, and/or optical rewritable non-volatile memory. The memory 230 is configured to store one or more electronic representations of textbooks and/or other educational content to be presented and/or accessed by a student to whom the portable student terminal 200 is assigned. In addition, the memory 230 may be configured to store identification data associated with the student, such as the student's name, address, photo, school year, class schedule and registration, and/or other student data, as described in greater detail below with reference to FIGS. 6A-6F.

The controller 240 is coupled to the transceiver 235, the memory 230, the speaker 238, and the user interface 255. The controller 240 may be, for example, a commercially available or custom microprocessor that is configured to coordinate and manage operations of the transceiver 235, the memory 230, the speaker 238, and the user interface 255. The user interface 255 includes a microphone 220, a display 210, a joystick 270, a keyboard/keypad 205, a touch sensitive display 260, a dial 275, navigation keys 280, and/or a pointing device 285 (such as a mouse, trackball, touchpad, etc.). However, additional and/or fewer elements of the user interface 255 may actually be provided depending on the particular functionalities offered by the portable student terminal 200.

FIG. 2B illustrates an external view of the portable student terminal 200 of FIG. 2A according to some embodiments, also referred to herein as a Neutron Reader. As shown in FIG. 2B, the portable student terminal 200 includes a housing 206 including the touch sensitive display 260, the keyboard/keypad 205, the mouse pad/pointing device 285, navigation keys 280, and a dial 275. The portable student terminal 200 further includes a power switch 201, a connector 202, such as a universal serial bus (USB) connector, a cartridge/media slot 203 configured to accept electronic representations of textbooks and/or other educational content stored on a cartridge, CD, DVD, and/or other removable storage media, and an eject button 204 used to eject the media that is currently loaded in the cartridge/media slot 203.

Referring now to FIGS. 2A and 2B, the controller 240 is configured to wirelessly receive a synchronization command transmitted from an instructor terminal in a classroom, such as the instructor terminal 140 of FIG. 1, via the transceiver 235. The synchronization command may be received as a signal broadcast from the instructor terminal according to the localized wireless connection protocol (for example, as a paging signal) and/or via an ad hoc wireless data connection established between the portable student terminal 200 and the instructor terminal. The synchronization command may include an identification of educational content that is currently displayed on the instructor terminal. For example, the synchronization command may identify a chapter, section, page, or problem of a geometry textbook that is currently displayed on the instructor terminal, and/or may include an open command instructing the portable student terminal 200 to load the geometry textbook.

Accordingly, responsive to receiving the synchronization command, the controller 240 is configured to display the educational content that is currently displayed on the instructor terminal via the display 260 of the portable student terminal 200. For instance, the portable student terminal 200 may be configured to access a geometry textbook stored in the internal memory 230 and/or provided on a cartridge or CD currently loaded in the cartridge/media slot 203, and the controller 240 may be configured to load the geometry textbook and display the specified portion thereof via the display 260 of the portable student terminal 200 responsive to the received synchronization command. The synchronization command may also identify an academic course associated with the educational content. As such, the controller 240 may be configured to determine whether the portable student terminal 200 is assigned to a student who is registered for the identified course, and may be configured to ignore the received synchronization command if the identified course does not match the student registration information stored in the memory 230.

The controller 240 is also configured to establish an ad hoc wireless data connection with the instructor terminal via the transceiver 235 according to the localized wireless connection protocol to provide a greater level of interaction between the student and the instructor. In some embodiments, the controller 240 may be configured to establish the ad hoc wireless data connection responsive to receiving the synchronization command via the transceiver 235. The controller 240 may also be configured to transmit a student's question regarding the displayed educational content to the instructor terminal via the ad hoc wireless data connection responsive to a student request received via the user interface 255 of the portable student terminal 200. Moreover, the controller 240 may be configured to receive student modifications of the displayed educational content via the user interface 255, and may transmit data indicating the modifications to the instructor terminal via the wireless data connection. For instance, using a stylus, the student may directly enter a solution to a math problem displayed on the touch sensitive display 260, and the controller 240 may transmit the solution to the instructor device over the wireless data connection. In response, the controller 240 may be configured to receive data indicating instructor corrections to the transmitted solution from the instructor terminal via the wireless data connection, and may display the instructor corrections via the touch sensitive display 260. Thus, the wireless data connection between the portable student device 200 and the instructor terminal may be used to enhance student/instructor interaction.

In addition, the controller 240 may be configured to provide information from the portable student device 200 responsive to receiving a request for such information from the instructor terminal via the ad hoc wireless data connection. For example, the controller 240 may be configured to transmit data indicating content that is currently displayed on the touch sensitive display 260 of the portable student terminal 200 to the instructor terminal responsive to receiving a request for such data via the ad hoc wireless data connection. In some embodiments, the controller 240 may be configured to transmit an alert signal to the instructor terminal whenever the educational content identified in the synchronization command is not displayed on the touch sensitive display 260. Moreover, the controller 240 may be configured to prevent display of content other than the educational content on the touch sensitive display 260 responsive to wirelessly receiving a lock command from the instructor terminal. As such, unauthorized use of the portable student terminal 200 may be monitored and/or controlled by the instructor terminal.

The controller 240 may further be configured to receive homework assignments via the wireless data connection with the instructor device. Such homework assignments may be completed using the portable student terminal 200 itself. For example, the controller 240 may be configured to provide access to a variety of word processing, graphics manipulation, and/or other software stored in the memory 230 and/or stored on a removable storage medium, which may be used by the student to complete the assigned homework. In addition, the controller 240 may be configured to store the completed homework assignment as a homework file in the memory 230, and may be configured to transmit the homework file to the instructor terminal via the ad hoc wireless data connection. The controller 240 may also be configured to encrypt the homework file prior to transmission from the portable student terminal 200, which may reduce the likelihood of plagiarism by other students.

Although FIGS. 2A and 2B illustrate an exemplary portable student terminal that may be used in communication systems for presenting educational content to a plurality of students according to some embodiments, it will be understood that embodiments are not limited to such a configuration, but are intended to encompass any configuration capable of carrying out the operations described herein. For example, although the memory 230 is illustrated as a separate component from the controller 240, the memory 230 or portions thereof may be considered as part of the controller 240. More generally, while particular functionalities are shown in particular blocks by way of illustration, functionalities of different blocks and/or portions thereof may be combined, divided, and/or eliminated.

FIG. 3 illustrates an instructor terminal 300 configured to be used with communication systems for presenting educational content to a plurality of students according to some embodiments. In some embodiments, the instructor terminal 300 may correspond to the instructor terminal 140 of FIG. 1. Moreover, in some embodiments, the instructor terminal 300 may be similar to the portable student terminal 200 of FIG. 2, but may include different software that is configured to perform the operations described in detail below. Referring now to FIG. 3, the instructor terminal 300 includes a wireless transceiver 335 coupled to an antenna 365, a controller 340, a memory 330, a speaker 338, and a user interface 355. Depending on the functionalities offered by the instructor terminal 300, the user interface 355 may include a microphone 320, a display 310, a joystick 370, a keyboard/keypad 305, a touch sensitive display 360, a dial 375, navigation keys 380, and/or a pointing device 385 (such as a mouse, trackball, touchpad, etc.). However, additional and/or fewer elements of the user interface 355 may actually be provided.

The transceiver 335 includes a transmitter 350 and a receiver 345. The transceiver 335 includes a wireless local area network interface transceiver configured to establish an ad hoc wireless connection with one or more portable student terminals in a classroom, such as the portable student terminal 200 of FIGS. 2A-2B, via the antenna 365. The transceiver 335 is configured to establish the ad hoc wireless data connections according to a localized wireless connection protocol, such as a Bluetooth, Wi-Fi, and/or IR connection protocol. While a single antenna 365 is illustrated in FIG. 3 by way of example, multiple antennas may be provided.

Still referring to FIG. 3, the memory 330 may be represent a hierarchy of memory that may include volatile and/or non-volatile memory, such as removable flash, magnetic, and/or optical rewritable non-volatile memory. The memory 330 is configured to store one or more electronic representations of textbooks and/or other educational content to be presented to the portable student terminals. The controller 340 is coupled to the transceiver 335, the memory 330, the speaker 338, and the user interface 355. The controller 340 may be, for example, a commercially available or custom microprocessor that is configured to coordinate and manage operations of the transceiver 335, the memory 330, the speaker 338, and the user interface 355.

The controller 340 may be configured to detect, discover, and/or authenticate one or more portable student terminals within a predetermined distance or transmission range of the transceiver 335, for instance, based on respective signals received from the portable student terminals using known discovery techniques. As such, the controller 340 may be configured to display educational content 395 to be presented to the portable student terminals via the touch sensitive display 360, and may be configured to wirelessly transmit a synchronization command to the portable student terminals according to the localized wireless connection protocol to display the educational content 395 thereon, as discussed above with reference to FIG. 1. For example, the controller 340 may be configured to broadcast the synchronization command via the transceiver 335, and may receive respective acknowledgement messages from one or more portable student terminals responsive to broadcasting the synchronization command. In some embodiments, the synchronization command may include the actual educational content 395 that is currently displayed on the instructor terminal 300. In other embodiments, the synchronization command may merely include an indication of the educational content 395, such as the name, section, and/or page of the corresponding textbook. The controller 340 may receive acknowledgement messages from only portable student terminals 105a-105f that are assigned to students who are registered for an academic course identified in the broadcast synchronization command. Accordingly, the controller 340 may be configured to generate and display a visual roster 398 on the touch sensitive display 360 indicating the local presence of the portable student terminals 105a-105f.

The controller 340 may also be configured to selectively establish ad hoc wireless data connections with one or more of the portable student terminals 105a-105f, for example, responsive to receiving a selection thereof from the visual roster 398. In addition, the controller 340 may be configured to identify one or more of the portable student terminals 105a-105f that are not currently displaying the educational content 395. For example, the controller may receive an alert signal from portable student terminal 105a indicating that the educational content 395 is not displayed thereon in response to the broadcast synchronization command, and may provide an identification 399 of the portable student terminal 105a via the touch sensitive display 360. The controller 340 may also be configured to transmit a request for data indicating the content currently displayed on the portable student terminal 105a via the respective ad hoc wireless data connection, and may display the content that is currently displayed on the portable student terminal 105a responsive to receiving the data over the ad hoc wireless data connection. The controller 340 may further wirelessly transmit a lock command to one or more of the portable student terminals 105a-105f to prevent display of content other than the educational content 395 that is currently displayed on the touch sensitive display 360. As such, the controller 340 of the instructor terminal 300 may monitor and/or control unauthorized use of the portable student terminals 105a-105f in the classroom.

The controller 340 may be further configured to enhance student/instructor interaction via the respective ad hoc wireless data connections with the portable student terminals 105a-105f. For example, as shown in FIG. 3, a math problem 395 is currently displayed on the touch sensitive display 360 of the instructor terminal 300. As discussed above, the controller 340 may wirelessly transmit a synchronization command instructing the portable student terminals 105a-105f to display the math problem 395 thereon. In addition, responsive to receiving a selection of the portable student terminal 105b via the touch sensitive display 360, the controller 340 may establish an ad hoc wireless data connection with the portable student terminal 105b. The controller 340 may transmit a request for data indicating the content currently displayed on the portable student terminal 105b via the wireless data connection, and may receive the corresponding student's solution 397 to the math problem 395 in response to the request. In some embodiments, the controller 340 may receive the student's solution 397 along with the math problem 395 as a modification of the original math problem 395 via the wireless data connection. The controller 340 may thereby display the student's solution 397 on the touch sensitive display 360 of the instructor terminal 300 for verification by the instructor. Using a stylus, the instructor may enter corrections to the student's solution 397 via the touch sensitive display 360. The controller 340 may also be configured to wirelessly transmit the student's solution 397 (as well as any instructor corrections thereto) to the remaining portable student terminals 105a and 105c-105f. As such, the controller 340 may allow an instructor to verify a student's solution to a presented problem, and if correct, to share the solution with the entire class.

Furthermore, the controller 340 may be configured to transmit and/or receive homework assignments via the respective ad hoc wireless data connections with the portable student terminals 105a-105f. For example, the controller 340 may be configured to broadcast a homework assignment to the plurality of portable student terminals 105a-105f via the transceiver 335. Alternatively, the controller 340 may receive respective requests for homework from one or more of the portable student terminals 105a-105f via the respective wireless data connections, and may thereby transmit the homework assignment to the requesting ones of the portable student terminals 105a-105f. In addition, the controller 340 may be configured to receive a completed homework file from one or more of the portable student terminals 105a-105f via the respective wireless data connections. The completed homework files may respectively identify the portable student terminal from which it was transmitted, and may be respectively encrypted by the corresponding portable student terminals. As such, the controller 340 may be configured to display an indication 391 of ones of the portable student terminals 105a-105f from which completed homework files have not been received via the touch sensitive display 360.

In some embodiments, the controller 340 may also be configured to compare the received homework files and determine a substantial similarity between ones of the received homework files based on the comparison. The controller 340 may thereby be configured to display an indication of ones of the portable student terminals 105a-105f from which the substantially similar homework files were received on the touch sensitive display 360. Accordingly, the instructor terminal 300 may identify students who may be guilty of cheating and/or plagiarism based on the received homework files from the corresponding ones of the portable student terminals 105a-105f.

Although FIG. 3 illustrates an exemplary instructor terminal that may be used in communication systems for presenting educational content to a plurality of students in a classroom according to some embodiments, it will be understood that embodiments are not limited to such a configuration, but are intended to encompass any configuration capable of carrying out the operations described herein. For example, although illustrated as a stationary device, the instructor terminal 300 may be provided as a portable and/or handheld terminal according to some embodiments. In addition, the controller 340 may be configured to perform one or more of the above-described functions via one or more fixed wireless transceivers in the classroom, which may be configured to wirelessly relay the educational data and/or other information from the instructor terminal 300 to one or more of the portable student terminals. More generally, while particular functionalities are shown in particular blocks by way of illustration, functionalities of different blocks and/or portions thereof may be combined, divided, and/or eliminated.

Figures 4A, 4B:
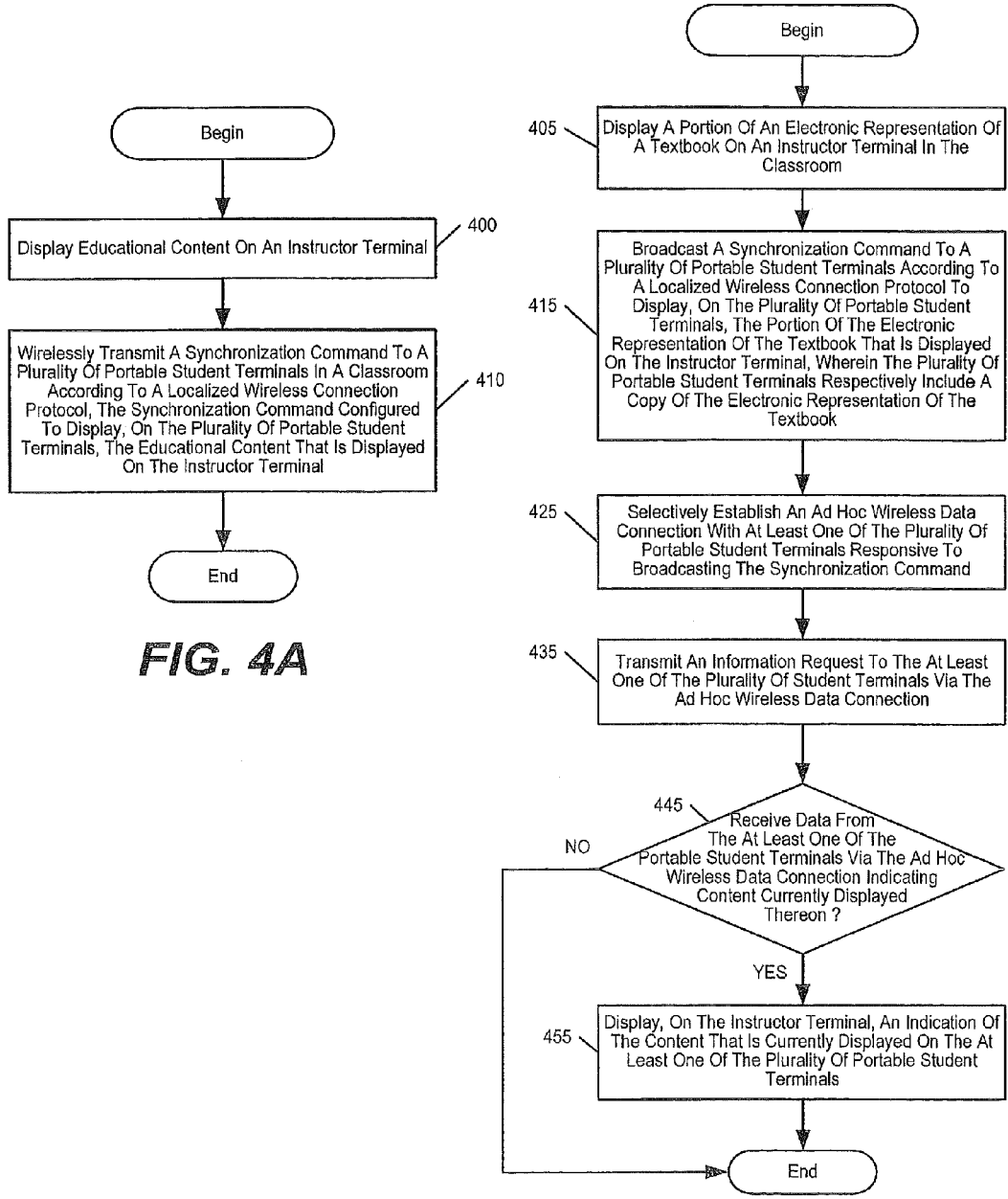
FIGS. 4A and 4B are flowcharts illustrating exemplary operations that may be performed by an instructor terminal in a communication system for presenting educational content to a plurality of students in a classroom according to some embodiments.

FIGS. 4A and 4B are flowcharts illustrating exemplary operations according to some embodiments that may be performed by an instructor device, such as the instructor terminal 300 of FIG. 3, to present educational content to a plurality of students in a classroom. Referring now to FIG. 4A, operations begin at Block 400 when educational content is displayed on an instructor terminal in the classroom. For example, the educational content may be an electronic representation of a textbook and/or a chapter, section, problem, page, and/or other portion thereof. A synchronization command is wirelessly transmitted to a plurality of portable student terminals in the classroom at Block 410. The synchronization command is wirelessly transmitted to the portable student terminals according to a localized wireless connection protocol, such as a Bluetooth, Wi-Fi, and/or IR connection protocol. The synchronization command is configured to instruct the portable student terminals to display the educational content that is currently displayed on instructor terminal. The portable student terminals are respectively associated with students who are registered for an academic course associated with the educational content. As such, the instructor terminal may control presentation of the educational content to each student who is registered for the course.

In some embodiments, an ad hoc wireless data connection may be selectively established with at least one of the plurality of portable student terminals in the classroom. For example, respective ad hoc wireless data connections may be established between the instructor terminal and multiple portable student terminals, and the synchronization command may be transmitted to the portable student terminals at Block 410 via the respective ad hoc wireless data connections. In other embodiments, the synchronization command may be broadcast to multiple portable student terminals at Block 410, for example, as a paging signal, and an ad hoc wireless data connection may be selectively established with one or more portable student terminals at responsive to the broadcast synchronization command. The ad hoc wireless data connection may be used to transmit data between the instructor terminal and the portable student terminals to monitor and/or control use of the portable student terminals, and/or to enhance student/instructor interaction, as discussed above with reference to FIG. 1.

FIG. 4B illustrates more detailed operations for presenting educational content a plurality of students according to some embodiments. Referring now to FIG. 4B, operations begin at Block 405 when a portion of an electronic representation of a textbook is displayed on instructor terminal in a classroom. A synchronization command is broadcast to a plurality of portable student terminals to display the currently displayed portion of the electronic representation of a textbook on the plurality of portable student terminals at Block 415. The portable student terminals respectively include a copy of the electronic representation of a textbook stored therein.

Still referring to FIG. 4B, an ad hoc wireless data connection is selectively established with at least one of the portable student terminals at Block 425 responsive to the broadcast synchronization command. The ad hoc wireless data connection may be established, for example, responsive to receiving an alert signal from one of the portable student terminals and/or responsive to receiving a selection of a particular portable student terminal at the instructor terminal. The ad hoc wireless data connection may be used to monitor and/or control unauthorized use of the portable student terminal. In particular, a request for information is transmitted to the portable student terminal via the ad hoc wireless data connection at Block 435. If data indicating content that is currently displayed on the portable student terminal is received from the portal student terminal at Block 445 via the ad hoc wireless data connection, the content that is currently displayed on the portable student terminal (or an indication thereof) is displayed on the instructor terminal at Block 455. Accordingly, an instructor may view the content currently displayed on one or more portable student terminals at any time on the instructor terminal responsive transmitting the request at Block 435, which may deter unauthorized use of the portable student terminals. Furthermore, the instructor may view a student's progress, for example, as indicated by the student's handwritten contribution to the presented educational content currently displayed on the portable student terminal, and may provide assistance when needed by transmitting and/or requesting additional data from the portable student terminal via the ad hoc wireless data connection.

Figure 5:
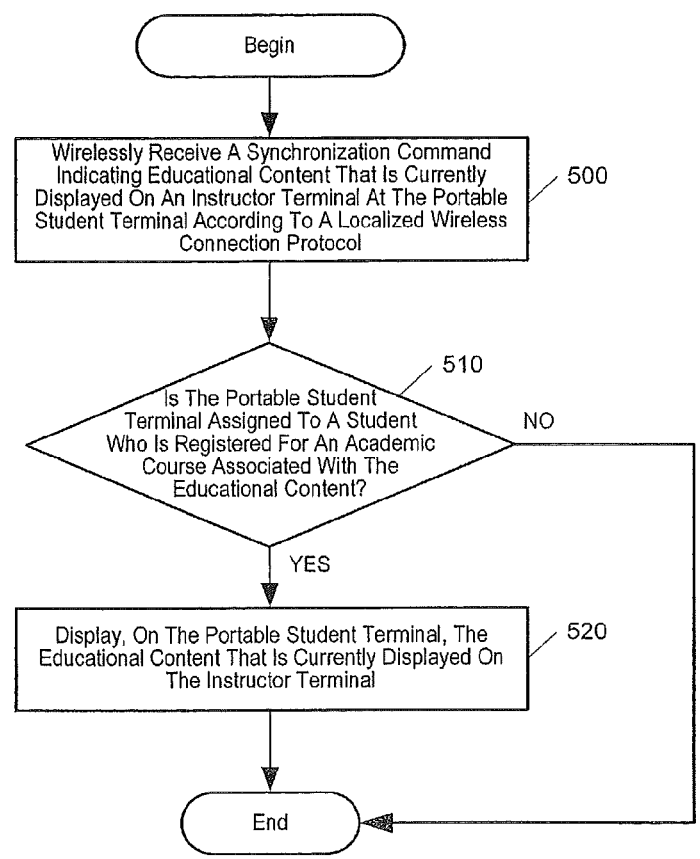
FIG. 5 is a flowchart illustrating exemplary operations that may be performed by a portable student terminal in a communication system for presenting educational content to a plurality of students in a classroom according to some embodiments.

FIG. 5 is a flowchart illustrating exemplary operations according to some embodiments that may be performed by a portable student device, such as the portable student terminal 200 of FIGS. 2A and 2B, to present educational content to a plurality of students in a classroom. Referring now to FIG. 5, operations begin when a synchronization command transmitted from an instructor terminal is wirelessly received at a portable student terminal at Block 500. The synchronization command is received according to a localized wireless connection protocol, such as a Bluetooth, Wi-Fi, and/or IR protocol, and includes an identification of an academic course associated with the educational content that is currently displayed on the instructor terminal. As such, it is determined at Block 510 whether the portable student terminal is assigned to a student who is registered for the academic course identified by the received synchronization command. If it is determined that the portable student terminal is indeed assigned to a student who is registered for the identified academic course at Block 510, the educational content that is currently displayed on the instructor terminal is displayed on the portable student terminal at Block 520. For example, where the educational content is a portion of an electronic representation of a textbook stored in the portable student terminal, the portion of the electronic representation of a textbook may be loaded and displayed on the portable student terminal responsive to receiving the synchronization command. However, if it is determined at Block 510 that the portable student terminal is assigned to a student who is not registered for the academic course associated with the educational content that is currently displayed on instructor terminal, the received synchronization command is ignored and operations end.

In addition, in some embodiments, an ad hoc wireless data connection may be established with the instructor terminal. For example, the ad hoc wireless data connection may be established with the instructor terminal in response to a determination at Block 510 that the portable student terminal is associated with a student who is registered for the academic course identified by the received synchronization command. As such, requests for additional data, such as data indicating the content currently displayed on the portable student terminal, may be transmitted and received between the portable student terminal and the instructor terminal via the ad hoc wireless data connection.

The flowcharts of FIGS. 4A-4B and 5 illustrate the architecture, functionality, and operations of some embodiments of communication system for presenting educational content to a plurality of students. In this regard, each Block may represent a module, segment, or a portion of code, which may comprise one or more executable instruction for implementing the specified logical functions. It should also be noted that in other implementations, the functions noted in the Blocks may occur out of the order noted in FIGS. 4A-4B and 5. For example, two Blocks shown in succession may, in fact, be executed substantially concurrently, or the Blocks may be sometimes executed in the reverse order, depending on the functionality involved.

Further embodiments will now be described with reference to the functionality of a portable student terminal configured to be used in a school system, such as the portable student terminal 200 of FIG. 2B, also referred to herein as a Neutron Reader. The Neutron Reader is a durable, handheld and/or portable electronic device that students may utilize to read and view electronic representations of textbooks stored on cartridges and/or other removable storage media, such as CDs. The size of the Neutron Reader may be similar to that of a typical textbook, e.g., 9.5"×11"×1.5". The Neutron Reader may be assigned or issued to a student at a particular level in the educational process (e.g. in the $6^{th}$ grade), and would be utilized by that student through the student's high school graduation. In some embodiments, there may also be versions of the Neutron Reader configured for use by younger students (e.g., in grades 1-5).

As the textbooks are stored on electronic storage media, such as cartridges, additional textbooks and/or changes to textbooks may be provided via software updates, which may reduce the financial burden on the school districts. In addition, the book cartridges for the Neutron Reader may be reusable, or may be relatively inexpensive and disposable. The cartridges may also include electronic representations of additional reading materials, which may be required by certain teachers in addition the content provided in the regular textbooks. The Neutron Reader may be further configured to translate textbooks into various languages.

The Neutron Reader utilizes a wireless local area network transceiver and a localized wireless connection protocol (lwcp) to establish an ad hoc wireless data connection and send information to an instructor or administrator terminal, such as the instructor terminal 300 of FIG. 3, when requested. The Neutron Reader also includes accompanying software to utilize the lwcp in both the classroom as well as in an administrator's office.

The Neutron Reader presents a relatively simple interface for students to open and begin reading their textbooks. More particularly, the Neutron Reader includes a touch sensitive display configured to accept electronic interaction via a stylus or finger, a roller wheel/dial, a mouse pad/pointing device, and navigation (i.e., page-up, page-down, up, down, left, and right, etc.) keys. The interface allows the students to move from one page to another, focus on an area of a page, and/or focus on a section of a page. The stylus may be used to write notes on the touch sensitive display, and the written notes can be captured and stored in the memory of the Neutron Reader. Accordingly, notes can be viewed and/or printed out with the underlying text accompanying the notes. This feature may be especially beneficial in math classes, as the students may work directly on the pages of the problems, save their work directly on the Neutron Reader, and submit their work to the instructor terminal via the ad hoc wireless data connection.

The Neutron Reader is also configured to allow students to complete homework tasks on the Neutron Reader itself. The Neutron Reader has the capability to print and save to an external source, in order to provide a variety of means to submit homework. In particular, the Neutron Reader may be configured to allow a student to capture and store notes written on a displayed page with the underlying text, print the stored notes, write, edit, save, and/or otherwise modify a displayed document, download pages, accept writing and/or other input and save such inputs, and/or send data to external source in an encrypted manner. Also, for students who may have access to computers and laptops in their homes, the connectivity hardware and/or software for the Neutron Reader may be compatible with Windows, Mac, and/or other commonly used operating systems. Thus, a student may be able to port his work from the Neutron Reader onto his personal computer (e.g., via a USB interface) and vice versa, which may allow greater flexibility. Additionally, an encryption methodology may be utilized by the Neutron Reader to reduce the possibility of students homework being misrepresented. For example, each Neutron Reader may include an encryption program configured to encrypt completed homework files prior to transmission thereof, to ensure that each homework file that is turned in is unique and to reduce the incidence of plagiarism. As such, students may be able to do their homework on their Neutron Reader, which may reduce the financial strain on lower income parents and/or schools to provide computers for this purpose.

Each Neutron Reader may be loaded with default personal identification information for each student for initial distribution. For example, a setup wizard application program may be used to set up a Neutron Reader with initial information for the new student, such as the student's name, school year/grade, class schedule (including teacher's names), map of the school, and/or any additional fields that may be defined by the school district.

FIGS. 6A-6F illustrate a plurality of database tables including examples of such default personal identification information. For instance, each Neutron Reader may be configured to store a plurality of tables 601-606 (FIGS. 6A-6F), including information such as the name of the student to whom it is assigned, the student's school district, and/or an image/photo of the student. In particular, as shown in FIG. 6A, the Neutron Reader may be configured to store a Student ID table 601 including the student's name, school year, and additional student identification information, such as a social security number; a School Name table 602 (FIG. 6B) including the school district, school name, and other school information; a Class Schedule table 603 (FIG. 6C) for the student including a listing of course names, times, classrooms, and teachers; a Student Photo ID table 604 (FIG. 6D) including photographic image data for the student and accompanying identification information; a School Map table 605 (FIG. 6E) including the school name and corresponding map data; and a Teacher Information table 606 (FIG. 6F) including identification information for each of the student's teachers. However, fewer and/or additional information may be stored in each Neutron Reader.

In addition, a previously used Neutron Reader may be reassigned to a new student in the school system, for example, upon the graduation of the student to which the Neutron Reader was previously assigned. As such, a wizard program may be used to facilitate deletion of information from the Neutron Reader to cleanly reassign it to a new student at any grade level and/or load the Neutron Reader with new student information.

Figure 7:
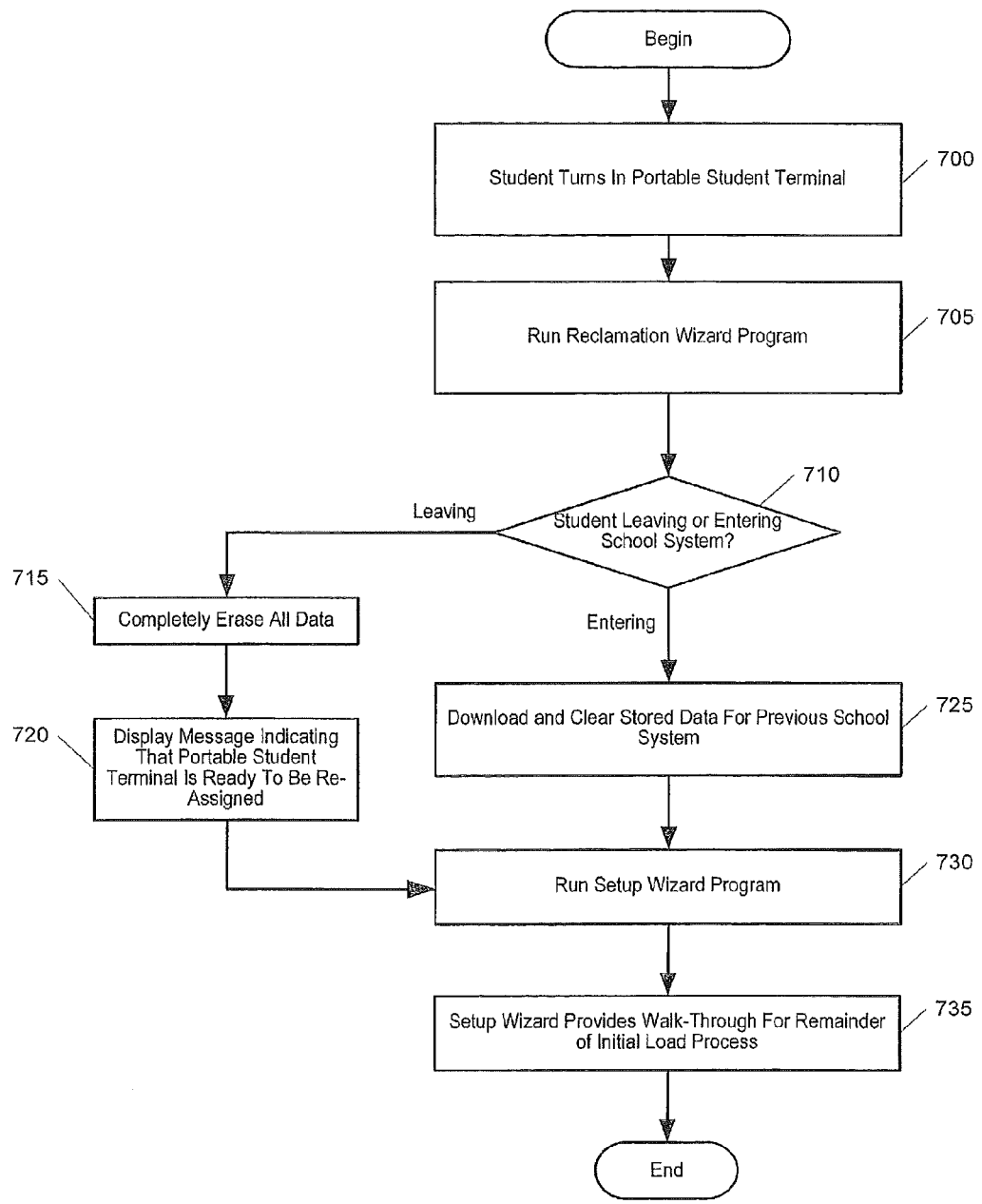
FIG. 7 is a flowchart illustrating exemplary operations for reclaiming a portable student terminal according to some embodiments.

FIG. 7 is a flowchart illustrating such a reclamation process according to some embodiments. Referring now to FIG. 7, a student provides his assigned Neutron Reader to a school official at Block 700, and the reclamation wizard program is run on the Neutron Reader at Block 705, for example, by a school administrator. At Block 710, it is determined whether the student currently assigned to the Neutron Reader is leaving or entering the school. For example, the student may be leaving the school system due to graduation from high school, or may be transferring into the school from another school within the district. If it is determined that the student is leaving the school at Block 710, the data stored in the Neutron Reader is completely erased at Block 715, and a message is displayed at Block 720 indicating that the Neutron Reader is ready to be re-assigned to a new student. In contrast, if it is determined at Block 710 that the student is entering the present school as a transfer student from a previous school in the school system, the schedule, homework files, and/or other data stored on the Neutron Reader that is related to the previous school is downloaded and cleared at Block 725. The setup wizard program is run on the Neutron Reader at Block 730 to load the Neutron Reader with initial personal identification information for the present school, such as the information illustrated in FIGS. 6A-6F. In some embodiments, the setup wizard may be automatically launched responsive to clearing the data previously stored on the Neutron Reader. Accordingly, at Block 735, the setup wizard walks the school administrator through the remainder of the initial load process for the transfer student, as described above, to prepare the Neutron Reader for use in the present school.

Still further embodiments will now be described with reference to the functionality of an instructor terminal configured to be used with Neutron Readers in a school setting, such as the instructor terminal 300 of FIG. 3. The instructor terminal may include software configured to queue a plurality of educational content (such as particular portions of different textbooks based on the day's lesson plans), and to send a synchronization command to display the educational content to all Neutron Readers in a classroom. In response to receiving the synchronization command, the Neutron Readers assigned to students who are registered for the course identified by the synchronization command are configured to "turn" to the page(s) currently displayed on the instructor terminal. Thus, the instructor terminal may command all of the Neutron Readers in the classroom to display a particular section of a textbook. For example, in Math class, the instructor terminal may narrow the focus of the students in the classroom to a single area or problem on a page.

The instructor terminal may also be configured to transmit a lock command to "lock" the Neutron Readers to display only a single page or set of pages, thereby preventing students from viewing unauthorized content, for example, during exams. The instructor terminal may be further configured to provide an audible, visible, and/or tactile alert signal if a Neutron Reader is not displaying the correct page in response to the synchronization command and/or is displaying unauthorized content. As such, the instructor terminal may request and receive data from that Neutron Reader indicating the content that is currently being displayed at any given time via the ad hoc wireless data connection. Such a feature may be used to prevent students from viewing non-educational content and/or otherwise abusing the functionality of the Neutron Reader. Moreover, the instructor terminal may use such a feature to determine if a student has fallen behind and/or is struggling with solving a previously presented problem.

The instructor terminal may be further configured to transmit homework assignments for the night, the week, or any given time period to all of the Neutron Readers in the classroom via the respective ad hoc wireless data connections. The instructor terminal may also include an application or program configured to collect completed homework files from the Neutron Readers the next day. For example, the instructor terminal may be configured to request and receive completed homework files from all of the Neutron Readers in a classroom responsive to depression of a single button on the instructor terminal to simplify the process. The collection program may also link the received homework files with the appropriate Neutron Readers based on the identification information stored in the Neutron Reader from which it was received. Completed homework files may also be turned in more traditional ways, such as by saving to an external key drive, printing to an external printer, and/or e-mailing the files to the instructor terminal. For work performed outside of a Neutron Reader, such as on a student's personal computer, the instructor terminal may associate the completed homework file with the Neutron Reader assigned to the student from whom it was received. The instructor terminal may thereby generate and display a roster, such as the visual attendance roster 398 of FIG. 3, indicating which Neutron Readers had turned in homework files and which Neutron Readers had not. The instructor terminal may also be configured to transmit a particular completed homework file to one or more Neutron Readers to be displayed and discussed in class in real-time.

In addition, the instructor terminal may be configured to transmit an identification request to each Neutron Reader in the classroom (via a respective ad hoc wireless data connection) requesting personal identification information from each Neutron Reader according to the localized wireless connection protocol. The requested identification information may include the name of the student assigned to the Neutron Reader, other identification information for the student (such as Social Security Number), the current school district, a picture or photographic image of the student, the student's current grade/level in school, the student's class schedule, and/or other data that may be defined by the instructor. The requested identification information may also include the student's current seating position in the classroom, for example, as identified from a radio frequency identification (RFID) tag included in each seating position.

As such, the instructor terminal may quickly determine class attendance based on a comparison of the received identification information from the students' Neutron Readers with the expected class roster. In particular, the instructor terminal may automatically identify which students are missing when identification information is not received from their assigned Neutron Readers, and may similarly identify any students who are in the classroom that do not match the expected class roster based on the identification information received from their Neutron Readers. Additionally, if a new student has been assigned to a class by a school administrator but is not reflected the class roster stored in the instructor terminal assigned to that class, the received identification information from a Neutron Reader may be configured to update the class roster in the instructor terminal, which may eliminate the need for additional administration intervention beyond the initial schedule setup on the Neutron Reader described above with reference to FIG. 7.

Based on the received personal identification information from the Neutron Readers in the classroom, the instructor terminal may generate a visual roster, such as the visual attendance roster 398 of FIG. 3, to which the instructor may refer, for example, for assistance in learning the students' names, faces, and/or seating assignments. The visual roster may also allow the instructor to view the personal identification information for all of the students in the classroom, and/or to view personal identification information for students one at a time, by row, column, alphabetically, and/or other combinations that may be selected by the instructor.

In addition, the instructor terminal may be configured to determine tardiness of one or more students by automatically transmitting the identification request at pre-set times, such as both when the bell rings and again n minutes after the bell rings. As such, the instructor terminal may compare the identification information received when the bell rings with the identification information received n minutes after the bell rings to determine which students are tardy without having to disrupt the flow of class. The number of minutes n may be selected by the school administration or the instructor.

Furthermore, the instructor terminal may be configured to communicate determined attendance information with one or more other administrator terminals, such as a master administrator terminal in the school's main office. The master administrator terminal may similarly communicate with instructor terminals in each of the school's classrooms, and as such, may be immediately updated with the status of all students in all classrooms. This may provide the school's main office with an up-to-the-minute census of all students. The instructor terminal may also be programmed on an individual basis to flag tardiness and/or absence of certain students, such as students who have been tardy and/or absent more than a predetermined number of times during a school year. This flag may result in transmission of a notice to the school's main office, a truancy officer, and/or an e-mail/page to the student's parents. The particular method and recipient of the notice may be selected based on the circumstances surrounding the particular student.

A handheld instructor terminal may be similarly used to identify students in school who are coming in late, walking the halls, etc., by transmitting identification requests to the Neutron Readers on an ad hoc basis. In particular, the instructor terminal may be configured to detect one or more Neutron Readers in a given area, and may establish an ad hoc wireless data connection with a selected one of the Neutron Readers using the localized wireless connection protocol to transmit an identification request thereto. In response, the instructor terminal may receive and display the personal identification information received from the selected Neutron Reader, which may be used to identify the student carrying the Neutron Reader. The identification information may include the name of the student assigned to the Neutron Reader, other identification information for the student (such as Social Security Number), the current school district, a photographic image of the student, the student's current grade/level in school, the student's class schedule, and/or other data that may be defined by the administrator. For example, the instructor terminal may display the photo of the student with her name and the class and/or classroom to which she is assigned at the present day and time, so that the administrator would know who the student is and where she is supposed to be. As such, a school administrator or other user of the instructor terminal may direct a student to the classroom in which she currently belongs based on the received personal identification information from her assigned Neutron Reader.

In the drawings and specification, there have been disclosed exemplary embodiments of the invention, and although specific terms are used, they are used in a generic and descriptive sense only and not for purposes of limitation, the scope of the invention being defined by the following claims.

That which is claimed:

1. A method of presenting educational content to a plurality of students, the method comprising:
    displaying the educational content on an instructor terminal located in a room;
    wirelessly transmitting a synchronization command from the instructor terminal to a plurality of portable student terminals located in the room according to a localized wireless connection protocol, wherein the synchronization command identifies an academic course associated with the educational content, wherein the synchronization command causes the plurality of portable student terminals in the room to respectively display the educational content;
    wirelessly receiving an alert signal from one of the plurality of portable student terminals according to the localized wireless connection protocol when the educational content is not displayed on the one of the plurality of portable student terminals responsive to transmitting the synchronization command, and when the displayed content on the one of the plurality of portable student terminals has changed without receipt of a synchronization command; and
    wirelessly transmitting a request for data indicating content currently display on the one of the plurality of portable student terminals.

2. The method of claim 1, further comprising:
    wirelessly receiving, from the plurality of portable student terminals, respective acknowledgment messages according to the localized wireless connection protocol indicating that respective students, to whom the plurality of portable student terminals are assigned, are registered for the academic course identified by the synchronization command;
    selectively establishing, by the instructor terminal, an ad hoc wireless data connection with one of the plurality of portable student terminals in the room according to the localized wireless connection protocol; and
    transmitting correction data indicating instructor corrections of the student solution data from the instructor terminal via the wireless data connection for display on the at least one of the plurality of portable student terminals.

3. The method of claim 2, wherein selectively establishing the ad hoc wireless data connection comprises establishing respective ad hoc wireless data connections with the plurality of portable student terminals according to the localized wireless connection protocol, and wherein wirelessly transmitting the synchronization command comprises wirelessly transmitting the synchronization command to the plurality of portable student terminals via the respective ad hoc wireless data connections.

4. The method of claim 1, further comprising:
transmitting an information request to the one of the plurality of portable student terminals via the ad hoc wireless data connection;
receiving data from the one of the plurality of portable student terminals via the ad hoc wireless data connection indicating content currently displayed on the one of the plurality of portable student terminals responsive to transmitting the information request; and
displaying, on the instructor terminal, an indication of the content that is currently displayed on the one of the plurality of portable student terminals.

5. The method of claim 1, wherein the educational content comprises a portion of an electronic representation of a textbook, wherein the plurality of portable student terminals respectively include a copy of the electronic representation of the textbook locally stored in a memory, and wherein wirelessly transmitting the synchronization command comprises:
broadcasting the synchronization command to the plurality of portable student terminals according to the localized wireless connection protocol, wherein the synchronization command includes an identification of the portion of the electronic representation of the textbook and causes the plurality of portable student terminals in the room to respectively load the portion of the electronic representation of the textbook from the respective memory and display the portion of the electronic textbook via a respective display.

6. The method of claim 1, further comprising displaying, on the instructor terminal, an identification of one of the plurality of students that is associated with the one of the plurality of portable student terminals responsive to receiving the alert signal.

7. The method of claim 1, further comprising:
wirelessly transmitting a lock command to at least one of the plurality of portable student terminals according to the localized wireless connection protocol, the lock command prevents display of content other than the educational content that is displayed on the instructor terminal.

8. The method of claim 1, further comprising:
queuing, at the instructor terminal, a plurality of educational content to be presented to the plurality of portable student terminals,
wherein wirelessly transmitting the synchronization command comprises sequentially transmitting synchronization commands to the plurality of portable student terminals, wherein the synchronization commands cause the plurality of portable student terminals to respectively display corresponding ones of the plurality of educational content responsive to selection at the instructor terminal.

9. The method of claim 1, further comprising:
receiving, at the instructor terminal, an instructor modification of the educational content; and
wirelessly transmitting the instructor modification to the plurality of portable student terminals according to the localized wireless connection protocol for display on the plurality of portable student terminals.

10. The method of claim 1, further comprising:
receiving a request for a homework assignment from the one of the plurality of portable student terminals via the ad hoc wireless data connection; and
transmitting the homework assignment to the one of the plurality of portable student terminals responsive to receiving the request.

11. The method of claim 1, further comprising:
receiving, at the instructor terminal, a homework file from the one of the plurality of portable student terminals via the ad hoc wireless data connection; and
displaying, on the instructor terminal, an indication of ones of the plurality of portable student terminals from which a homework file has not been received.

12. The method of claim 1, further comprising:
comparing, at the instructor terminal, homework files received from ones of the plurality of portable student terminals; and
displaying, at the instructor terminal, an identification of ones of the plurality of portable student terminals corresponding to substantially similar ones of the received homework files responsive to the comparing.

13. The method of claim 1, further comprising:
wirelessly receiving, at the plurality of portable student terminals, the synchronization command transmitted from the instructor terminal according to the localized wireless connection protocol; and
displaying, on the plurality of portable student terminals, the educational content.

14. A computer program product for presenting educational content via a portable student terminal located in a room, the computer program product comprising tangible computer readable storage medium including computer readable program code, the computer readable program code, when executed by a processor, carries out a method comprising:
wirelessly receiving, at the portable student terminal, a synchronization command transmitted from an instructor terminal located in the room according to a localized wireless connection protocol, the synchronization command indicating educational content that is currently displayed on the instructor terminal and identifying an academic course associated with the educational content;
displaying the educational content on the portable student terminal;
wirelessly transmitting an alert signal to the instructor terminal according to the localized wireless connection protocol when the educational content is not displayed on the portable student terminal and when the displayed content on the portable student terminal has changed without receipt of a synchronization command; and
wirelessly transmitting data to the instructor terminal indicating content currently displayed on the one of the plurality of portable student terminals.

15. The computer program product of claim 14, wherein the educational content comprises a portion of an electronic representation of a textbook, wherein the portable student terminal includes a copy of the electronic representation of the textbook locally stored in a memory, wherein the synchronization command includes an identification of the portion of the electronic representation of the textbook, and wherein displaying the education content further comprises:
loading the portion of the electronic representation of the textbook from the memory responsive to receiving the synchronization command including the identification of the portion of the electronic representation of the textbook; and displaying the portion of the electronic representation of the textbook via a display of the portable student terminal.

16. The computer program product of claim 14, wherein the method further comprises:

establishing an ad hoc wireless data connection with the instructor terminal according to the localized wireless connection protocol.

17. The computer program product of claim 16, wherein the method further comprises:

encrypting, at the portable student terminal, a completed homework file associated with the portable student terminal; and transmitting the completed homework file to the instructor terminal via the ad hoc wireless data connection.

18. The computer program product of claim 16, wherein the method further comprises:

modifying, at the portable student terminal, the educational content displayed on the portable student terminal to provide modified educational content;

transmitting data indicating the modified educational content to the instructor terminal via the wireless data connection;

receiving data indicating instructor corrections to the modified educational content from the instructor terminal via the wireless data connection; and displaying the instructor corrections on the portable student terminal.

19. The computer program product of claim 14, wherein the method further comprises:

wirelessly receiving a lock command from the instructor terminal according to the localized wireless connection protocol; and preventing display of content other than the educational content on the portable student terminal responsive to receiving the lock command.

* * * * *